United States Patent
Shin et al.

(10) Patent No.: US 12,332,196 B2
(45) Date of Patent: Jun. 17, 2025

(54) LASER LIGHT SOURCE AND PHOTOELECTRON MICROSCOPE

(71) Applicants: The University of Tokyo, Tokyo (JP); Oxide Corporation, Yamanashi (JP)

(72) Inventors: Shik Shin, Tokyo (JP); Toshiyuki Taniuchi, Tokyo (JP); Shinichi Imai, Yamanashi (JP); Kazuo Fujiura, Yamanashi (JP); Yasunori Furukawa, Yamanashi (JP)

(73) Assignees: The University of Tokyo, Tokyo (JP); Oxide Corporation, Yamanashi (JP)

( * ) Notice: Subject to any disclaimer, the term of this patent is extended or adjusted under 35 U.S.C. 154(b) by 729 days.

(21) Appl. No.: 17/615,814

(22) PCT Filed: Jun. 1, 2020

(86) PCT No.: PCT/JP2020/021660
§ 371 (c)(1),
(2) Date: Dec. 1, 2021

(87) PCT Pub. No.: WO2020/246438
PCT Pub. Date: Dec. 10, 2020

(65) Prior Publication Data
US 2022/0276187 A1    Sep. 1, 2022

(30) Foreign Application Priority Data
Jun. 3, 2019   (JP) .................................. 2019-103808

(51) Int. Cl.
G01N 23/227    (2018.01)
G02B 21/06     (2006.01)
(Continued)

(52) U.S. Cl.
CPC ........... *G01N 23/227* (2013.01); *G02B 21/06* (2013.01); *G02F 1/353* (2013.01); *H01S 3/0092* (2013.01); *H01S 3/0816* (2013.01)

(58) Field of Classification Search
CPC ........... G01N 23/227; G01N 2223/073; G01N 2223/33; G02B 21/06; G02F 1/353;
(Continued)

(56) References Cited

U.S. PATENT DOCUMENTS

| | | | |
|---|---|---|---|
| 6,115,402 A * | 9/2000 | Caprara | H01S 3/07 372/101 |
| 2002/0034198 A1* | 3/2002 | Masuda | G11B 7/125 |
| 2006/0050748 A1* | 3/2006 | Sumiyoshi | G02F 1/3534 372/5 |

(Continued)

FOREIGN PATENT DOCUMENTS

| | | |
|---|---|---|
| JP | 2000340159 A | 12/2000 |
| JP | 2004055695 A | 2/2004 |

(Continued)

OTHER PUBLICATIONS

Liu G, Wang G, Zhu Y, Zhang H, Zhang G, Wang X, Zhou Y, Zhang W, Liu H, Zhao L, Meng J, Dong X, Chen C, Xu Z, Zhou XJ. "Development of a vacuum ultraviolet laser-based angle-resolved photoemission system with a superhigh energy resolution better than 1 meV." Rev Sci Instrum. Feb. 2008;79(2 Pt 1):023105. doi: 10.1063/1.2835901. PMID: 18315281.

(Continued)

*Primary Examiner* — Xinning(Tom) Niu
(74) *Attorney, Agent, or Firm* — Fox Rothschild LLP; Carol E. Thorstad-Forsyth

(57) ABSTRACT

A laser light source for a photoemission electron microscope for emitting a coherent light includes: a first laser light source configured to emit a continuous wave coherent light; an optical resonator including an optical path in which the continuous wave coherent light is configured to circulate and (Continued)

including a non-linear optical element disposed on the optical path; and a quasi-continuous wave light source configured to emit a quasi-continuous wave coherent light having a wavelength shorter than that of the continuous wave coherent light and having a near rectangular output waveform. When the quasi-continuous wave coherent light is incident on the non-linear optical element from outside the optical resonator while the continuous wave coherent light is entering the optical resonator to circulate in the optical path, the coherent light having a wavelength shorter than that of the quasi-continuous wave coherent light is emitted from the non-linear optical element.

13 Claims, 4 Drawing Sheets

(51) Int. Cl.
  *G02F 1/35* (2006.01)
  *H01S 3/00* (2006.01)
  *H01S 3/081* (2006.01)
(58) Field of Classification Search
  CPC ..... G02F 1/37; H01S 3/00; H01S 3/10; H01S 3/136; H01S 3/0071; H01S 3/0092
  See application file for complete search history.

(56) References Cited

U.S. PATENT DOCUMENTS

| | | | |
|---|---|---|---|
| 2008/0181269 A1* | 7/2008 | Osako | B23K 26/0622 372/30 |
| 2013/0144561 A1* | 6/2013 | Harb | G01N 21/31 702/189 |
| 2016/0005566 A1* | 1/2016 | Zewail | H01J 37/26 250/311 |
| 2019/0283177 A1* | 9/2019 | Kakizaki | B23K 26/40 |

FOREIGN PATENT DOCUMENTS

| | | |
|---|---|---|
| JP | 2004070338 A | 3/2004 |
| JP | 2006073970 A | 3/2006 |
| JP | 2014059578 A | 4/2014 |
| JP | 2014191220 A | 10/2014 |
| WO | 1999014631 A1 | 3/1999 |
| WO | WO-2018159272 A1 * | 9/2018 ........... G01N 23/227 |

OTHER PUBLICATIONS

Y. Kaneda and S. Kubota, "CW solid-state ultraviolet laser for optical disk mastering application," in IEEE Journal of Selected Topics in Quantum Electronics, vol. 3, No. 1, pp. 35-39, Feb. 1997, doi: 10.1109/2944.585811.

International Search Report issued in PCT/JP2020/021660 dated Aug. 25, 2020.

* cited by examiner $hv_1 > hv_2 > \phi$

LASER LIGHT SOURCE AND PHOTOELECTRON MICROSCOPE

CROSS REFERENCE TO RELATED APPLICATIONS

The present application is a U.S. National Phase of International Patent Application No. PCT/JP2020/021660, filed Jun. 1, 2020, which claims the benefit and priority of Japanese Patent Application No. 2019-103808 which was filed on Jun. 3, 2019. The entirety of these applications are incorporated herein by reference.

TECHNICAL FIELD

The present invention relates to a laser light source and a photoemission electron microscope.

BACKGROUND ART

Photoemission electron microscopes have been known to irradiate a sample with a high-energy laser as excitation light, and detect and image photoelectrons emitted from the sample. A photoemission electron microscope is an electron projection microscope that magnifies and images photoelectrons emitted from a material by irradiation with excitation light. This technique is utilized for chemical mapping and magnetic imaging of a material to obtain spatial resolution of about 20 nm. In particular, when the excitation light of photon energy higher than a work function is used, it is possible to obtain contrast strongly depending on the magnitude of the work function, and visualize conductivity, valence, crystalline nature, magnetism, and the like.

As described above, the photoemission electron microscope is a device capable of two-dimensionally visualizing a structure or physical properties of a material with high resolution, and holds promise for industrial use in many fields. To achieve this goal, a short measurement time is required while maintaining high resolution. In order to shorten the measurement time, it is necessary to irradiate a sample with a high-energy excitation light with high intensity to obtain sufficient photoelectron density, thereby obtaining high contrast.

For example, Patent Literature 1 discloses a method of generating a continuous wave (CW) laser having high energy (short wavelength) using a technique of sum frequency generation. Specifically, Patent Literature 1 discloses a laser device which causes a first laser and a second laser to enter a resonator having a non-linear optical element on a circulating optical path, allowing the first laser to circulate in the optical path and pass through the non-linear optical element and allowing the second laser to pass once through the non-linear optical element, thereby generating a sum frequency, and outputting a third laser having a wavelength shorter than that of the second laser.

CITATION LIST

Patent Literature

Patent Literature 1: Japanese Laid-Open Patent Publication No. 2004-055695

SUMMARY OF INVENTION

Technical Problem

In the laser device disclosed in Patent Literature 1, a fundamental wave light (first laser) is confined in the resonator to enhance the optical electric field in the resonator, which requires an optical path length in the resonator being strictly controlled. However, when intensities of the first laser and the second laser are increased in order to increase the intensity of the third laser, a refractive index of an optical component in the resonator, such as the non-linear optical element, is changed due to an excessive heat load or the like, which leads to a change in resonator length. As a result, the second laser may not be oscillated in the resonator, and thus the laser device may be stopped.

Therefore, the present invention has been made in view of the foregoing, and an object of the present invention is to provide a high-energy and high-powered laser light source and a photoemission electron microscope using the laser light source.

Solution to Problem

A laser light source according to the invention is a laser light source for a photoemission electron microscope for emitting a coherent light. The laser light source includes: a first laser light source configured to emit a continuous wave coherent light; an optical resonator including an optical path in which the continuous wave coherent light is configured to circulate and including a non-linear optical element disposed on the optical path; and a quasi-continuous wave light source configured to emit a quasi-continuous wave coherent light having a wavelength shorter than that of the continuous wave coherent light and having a near rectangular output waveform. When the quasi-continuous wave coherent light is incident on the non-linear optical element from outside the optical resonator while the continuous wave coherent light is entering the optical resonator to circulate in the optical path, the coherent light having a wavelength shorter than that of the quasi-continuous wave coherent light is configured to be emitted from the non-linear optical element.

A photoemission electron microscope according to the invention includes the laser light source described above.

Advantageous Effect of Invention

According to the present invention, when a quasi-continuous wave coherent light having a near rectangular waveform is incident on a non-linear optical element while a continuous wave coherent light is circulating in an optical path in a resonator, a coherent light having a wavelength shorter than that of the quasi-continuous wave coherent light is emitted from the non-linear optical element. Hence, there is a period during which no light absorption is present or an amount of light absorption is small in the non-linear optical crystal, thereby inhibiting the light absorption by that amount, reducing a heat load on the non-linear optical element, and improving an effective output of a laser light source. Therefore, it is possible to improve a measurement throughput by higher intensity irradiation than usual.

DESCRIPTION OF EMBODIMENTS (1) Regarding a Photoemission Electron Microscope Using a Laser Light Source According to Embodiments of the Present Invention A laser light source according to the embodiments is used as a light source of a photoemission electron microscope. Reference will be made below to a laser light source according to the embodiments by taking a light source of a photoemission electron microscope 1 shown in FIG. 1 as an example. The photoemission electron microscope 1 described below is illustrative only, and various modifications may be made to a configuration of the photoemission electron microscope 1. The laser light source according to the embodiments of the present invention may be used as a light source of any other types of photoemission electron microscopes.

Figure 1:
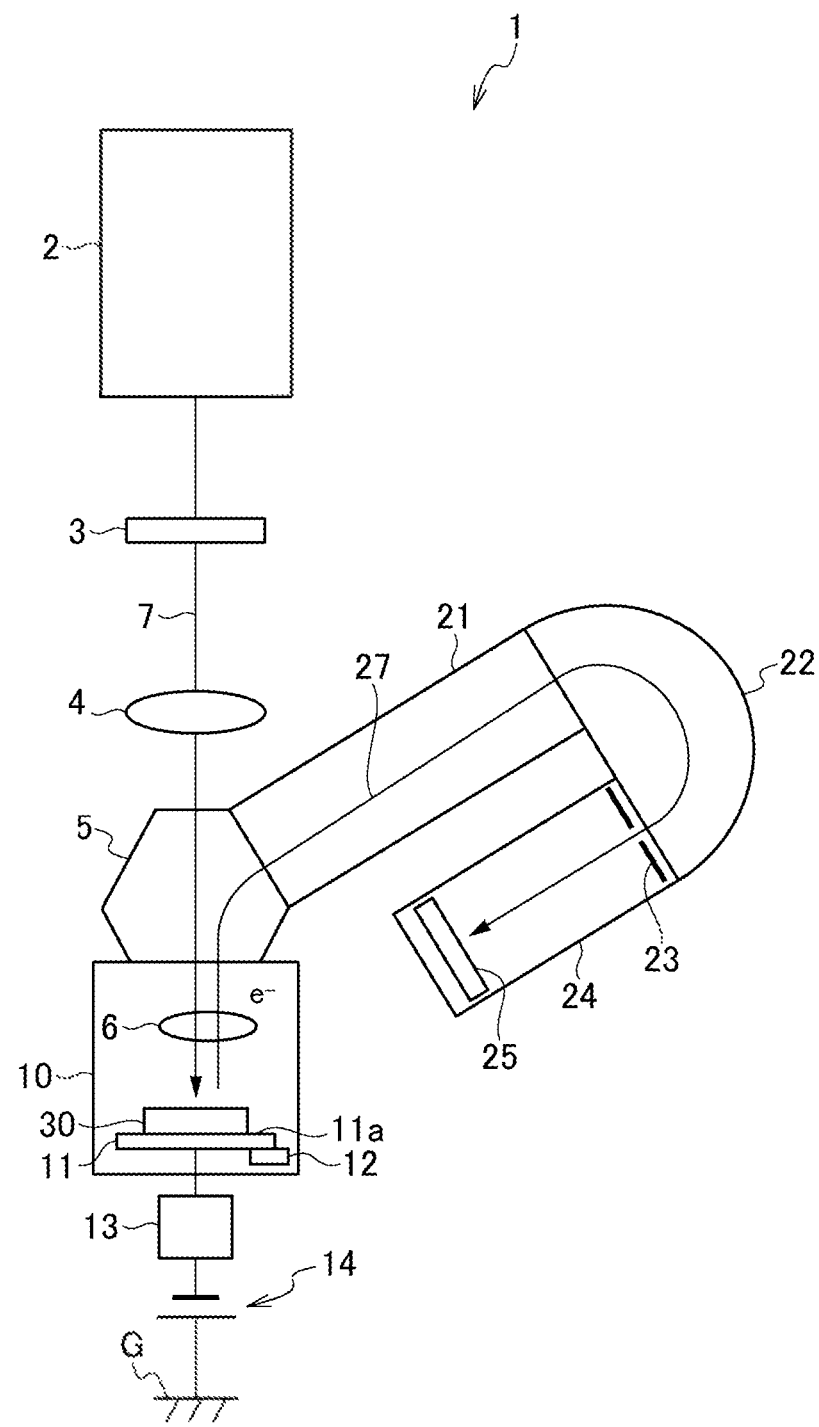
FIG. 1 is a schematic view of an overall configuration of a photoemission electron microscope using a laser light source according to embodiments of the present invention.

First, an overall configuration of the photoemission electron microscope 1 will be described. As shown in FIG. 1, the photoemission electron microscope 1 includes a laser light source 2, a wavelength plate 3, an irradiation lens system including a focusing lens 4 and an objective lens 6, a beam separator 5, a chamber 10, an energy adjusting mechanism 13, a power source 14, a first electron lens system 21, an energy analyzer 22, an energy slit 23, a second electron lens system 24, and an electron beam detector 25.

The laser light source 2 is a laser oscillator for emitting a quasi-continuous wave laser 7 as a coherent light. The quasi-continuous wave laser 7 is a laser having a near rectangular output (intensity) waveform which shows an emission state (also referred to as a high level) and a stop state (also referred to as a low level) alternately. When the output is in a low level, it is desirable that the output of the quasi-continuous wave laser 7 should be stopped, but a small output may be allowed without being completely stopped. As described above, the term "quasi-continuous wave" as used herein indicates that the output waveform is near rectangular.

The term "near rectangular" means that the waveform is exactly rectangular or approximately rectangular. Examples of the near rectangular waveform include a rectangular waveform with rounded corners, a trapezoidal waveform in which an upper side is shorter than a lower side, a rectangular waveform with an arcuate upper side, an arc-shaped waveform, a rectangular waveform with a wavy upper side, and a waveform having at least one peak. In the embodiments, the quasi-continuous wave laser 7 is a laser with such an output waveform. The wavelength of the quasi-continuous wave laser 7 is selected such that energy hv of the quasi-continuous wave laser 7 is higher than a work function $\phi$ of a measurement sample 30 which is a measurement target, so that photoelectrons can be emitted from the measurement sample 30 by irradiation with the quasi-continuous wave laser 7. More specifically, the energy is set to be higher than the work function $\phi$ of a material forming an outermost layer of an observation region of the measurement sample 30. As described above, the wavelength of the quasi-continuous wave laser 7 is appropriately selected according to the work function $\phi$ of the material forming the measurement sample 30. The configuration of the laser light source 2 will be described later.

The wavelength plate 3 is an element for switching polarization of the quasi-continuous wave laser 7 between linear polarization and right/left circular polarization. In general, the quasi-continuous wave laser 7 is linearly polarized by the wavelength plate 3. However, in order to measure magnetic characteristics of the measurement sample 30 using magnetic circular dichroism, the quasi-continuous wave laser 7 is right and left circularly polarized by the wavelength plate 3.

In the irradiation lens system, the focusing lens 4 focuses the quasi-continuous wave laser 7 onto the objective lens 6, and the objective lens 6 focuses the quasi-continuous wave laser 7 onto a surface of the measurement sample 30 to irradiate the measurement sample 30 with the quasi-continuous wave laser 7. The objective lens 6 is disposed such that the focus position is near the surface of the measurement sample 30. The focusing lens 4 and the objective lens 6 are known lenses, and can be appropriately selected according to, for example, a size of the irradiation region of the quasi-continuous wave laser 7, that is, the size of the observation region of the measurement sample 30. In the embodiments, the irradiation lens system focuses the quasi-continuous wave laser 7 on a part of the surface of the measurement sample 30 to produce a spot of light, but may focus the quasi-continuous wave laser 7 on the entire surface of the measurement sample 30, which makes it possible to observe the entire measurement sample 30 at once. The beam separator 5 will be described later.

The chamber 10 has a highly airtight structure, and a vacuum pump such as a turbo-molecular pump (not shown) is connected to the chamber 10. The internal space of the chamber 10 is set to a predetermined degree of vacuum ($1.0 \times 10^{-5}$ to $10^{-8}$ Torr) by the vacuum pump. Inside the chamber 10, a stage 11 on which the measurement sample 30 is placed and the objective lens 6 are disposed. In the embodiments, the chamber 10 and the beam separator 5 are connected to each other, and the objective lens 6 is fixed to the beam separator 5. However, for the sake of convenience, the beam separator 5 and the objective lens 6 are shown separately from each other in FIG. 1. A driving mechanism 12 is connected to the stage 11 to move the stage 11 in three axial directions orthogonal to each other. In the embodiments, the stage 11 has a placement surface 11a on which the measurement sample 30 is configured to be placed, and the placement surface 11a is orthogonal to an optical axis of the quasi-continuous wave laser 7.

The measurement sample 30 is placed on the placement surface 11a of the stage 11 in the chamber 10 so that the quasi-continuous wave laser 7 is perpendicularly incident on the surface.

The photoemission electron microscope 1 includes the power source 14 whose negative side is connected to the stage 11 and whose positive side is connected to ground G so that a negative voltage can be applied to the measurement sample 30. The power source 14 is a general power source capable of outputting a high voltage. In the embodiments, a voltage of −20 kV is applied to the measurement sample 30 by the power source 14. As a result, an electric field is generated between the measurement sample 30 and the beam separator 5 to which no voltage is applied. This electric field facilitates the emission of photoelectrons from the measurement sample 30, and accelerates the emitted photoelectrons toward the beam separator 5 so that electron beams 27 can be attracted to the beam separator 5. As used herein, a large number of emitted photoelectrons are collectively referred to as electron beams 27.

The photoemission electron microscope 1 includes the energy adjusting mechanism 13 between the power source 14 and the stage 11. The energy adjusting mechanism 13 is a power source configured to output a specified voltage STV. The energy adjusting mechanism 13 and the power source 14 are connected in series so that a total voltage of STV and the output voltage of the power source 14 can be applied to the measurement sample 30. The energy adjusting mechanism 13 can adjust energy Ep of the photoelectrons emitted from the measurement sample 30 by adjusting the value of STV. When kinetic energy of the photoelectrons is denoted by Ek, the energy Ep of the photoelectrons is given by Ep=20 kV+Ek−STV in the embodiments. The kinetic energy Ek of the photoelectrons is generated by excitation of electrons in the measurement sample 30 irradiated with the quasi-continuous wave laser 7, and changes depending on energy E of electrons in a material. Therefore, the energy Ep of the photoelectrons also depends on the energy E of the electrons in the material.

The beam separator 5 transmits the quasi-continuous wave laser 7 to be focused on the objective lens 6 by the focusing lens 4, and deflects the electron beams 27 emitted and entered from the measurement sample 30 toward the first electron lens system 21 to separate the path of the quasi-continuous wave laser 7 from the path of the electron beams 27. The beam separator 5 has an exit opening connected to the first electron lens system 21 to cause the deflected electron beams 27 to enter the first electron lens system 21 through the exit opening. The first electron lens system 21 includes a plurality of electron lenses to focus the incident electron beams 27. The first electron lens system 21 has one end connected to the beam separator 5 and has the other end connected to the energy analyzer 22 to focus the electron beams 27 onto the energy analyzer 22 and cause the electron beams 27 to enter the energy analyzer 22.

The energy analyzer 22 is a known energy analyzer to disperse the incident electron beams 27 according to energy Ep of the photoelectrons and output the electron beams 27 dispersed according to energy Ep. The energy analyzer 22 has a hemispherical shape with a flat portion on which an incident opening and an exit opening for beams are provided. The energy analyzer 22 has the incident opening connected to the first electron lens system 21 and has the exit opening connected to the second electron lens system 24, disperses the electron beams 27 entered from the first electron lens system 21 according to energy Ep of the photoelectrons, and outputs the electron beams 27 to the second electron lens system 24.

The energy slit 23 is provided at the exit opening of the energy analyzer 22. The energy slit 23 is a general slit having a penetrating slot provided linearly in a plate-shaped member. The energy slit 23 allows the electron beam 27 irradiating the slot to pass therethrough, and blocks the electron beams 27 irradiating the plate-shaped member. In practice, the electron beams 27 irradiating the plate-shaped member are not completely blocked, and a part of the electron beams 27 also passes through the energy slit 23. Since only a part of the electron beams 27 irradiating the plate-shaped member passes through the energy slit 23, the energy slit 23 lowers the intensity of the electron beams 27 other than the electron beam 27 irradiating the slot. In the embodiments, the width of the slot of the energy slit 23 is 40 μm.

Since the energy slit 23 is disposed at the exit opening of the energy analyzer 22, an electron beam 27 passed through the energy slit 23 among the electron beams 27 dispersed by the energy analyzer 22 enters the second electron lens system 24. At this time, since the electron beams 27 are dispersed by the energy analyzer 22 depending on energy Ep of the photoelectrons, a passing position of the electron beam 27 in the exit opening is also defined depending on energy Ep of the photoelectrons. Therefore, by adjusting the position of the energy slit 23, it is possible to select the energy Ep of the photoelectron to be detected by the electron beam detector 25. The energy Ep of the photoelectrons depends on the energy E of the electrons in a material (in the measurement sample 30). Hence, by changing the position of the energy slit 23, it is possible to select the energy E in the measurement sample 30 and select the electrons in the measurement sample 30 to be detected.

At the same time, the energy Ep of the photoelectrons can be changed by changing the value of STV because the energy Ep of the photoelectrons is given by Ep=20 kV+Ek−STV. Hence, by changing the value of STV, it is possible to select the energy Ep of the photoelectrons to be detected by the electron beam detector 25 and select the electrons in the measurement sample 30 to be detected.

The second electron lens system 24 includes a plurality of electron lenses to project the incident electron beam 27 onto the electron beam detector 25. The electron beam detector 25 is a two-dimensional photoelectron detector configured to detect a photoelectron of the projected electron beam 27 and generate an image of the measurement sample 30 based on the intensity of the detected photoelectron. The electron beam detector 25 is connected to a PC (not shown), and can send the generated image to the PC to store the image in a storage device of the PC, or to display the image on a monitor of the PC, allowing an operator of the photoemission electron microscope 1 to check the image.

Next, an operation of the photoemission electron microscope 1 will be described. First, in the photoemission electron microscope 1, the measurement sample 30 is placed on the placement surface 11a of the stage 11 in the chamber 10. Thereafter, in the photoemission electron microscope 1, the chamber 10 is evacuated, and the driving mechanism 12 moves the stage 11 to an initial position, and moves the stage 11 such that the focus position of the objective lens 6 is near the surface of the measurement sample 30. In the photoemission electron microscope 1, the laser light source 2 is turned on to irradiate the measurement sample 30 with the quasi-continuous wave laser 7.

As described above, the wavelength of the quasi-continuous wave laser 7 is selected such that the energy by of the quasi-continuous wave laser 7 is higher than the work function ϕ of the outermost layer (Pt in the embodiments) of the measurement sample 30. Therefore, when the measurement sample 30 is irradiated with the quasi-continuous wave laser 7, a photoelectric effect occurs, and electrons of the measurement sample 30 are excited to emit a large number of photoelectrons (electron beams 27) from the region irradiated with the quasi-continuous wave laser 7. The beam separator 5 causes the electron beams 27 to enter the first electron lens system 21, and the first electron lens system 21 focuses the electron beams 27 onto the energy analyzer 22.

The energy analyzer 22 disperses the electron beams 27 depending on energy Ep of the photoelectrons, and an electron beam 27 is selected by the energy slit 23 to enter the second electron lens system 24. The second electron lens system 24 projects the electron beam 27 passed through the energy slit 23 onto the electron beam detector 25. The electron beam detector 25 detects a photoelectron of the projected electron beam 27, and generates an image based on the intensity of the detected photoelectron. In this manner, the photoemission electron microscope 1 captures the image of the region of the measurement sample 30 irradiated with the quasi-continuous wave laser 7.

After the image capturing at the initial position, the photoemission electron microscope 1 causes the driving mechanism 12 to move a position of an irradiation spot of the quasi-continuous wave laser 7 on the surface of the measurement sample 30 by moving the stage 11, thereby again capturing an image of the region of the measurement sample 30 irradiated with the quasi-continuous wave laser 7. In this manner, the photoemission electron microscope 1 repeats the image capturing and the stage moving to scan the entire surface of the measurement sample 30, and thus acquires an image of the entire surface of the measurement sample 30. The movement amount of the stage is appropriately set in consideration of size of the irradiation spot of the quasi-continuous wave laser 7 and other factors so as to generate an image of the entire surface of the measurement sample 30.

Figure 2:
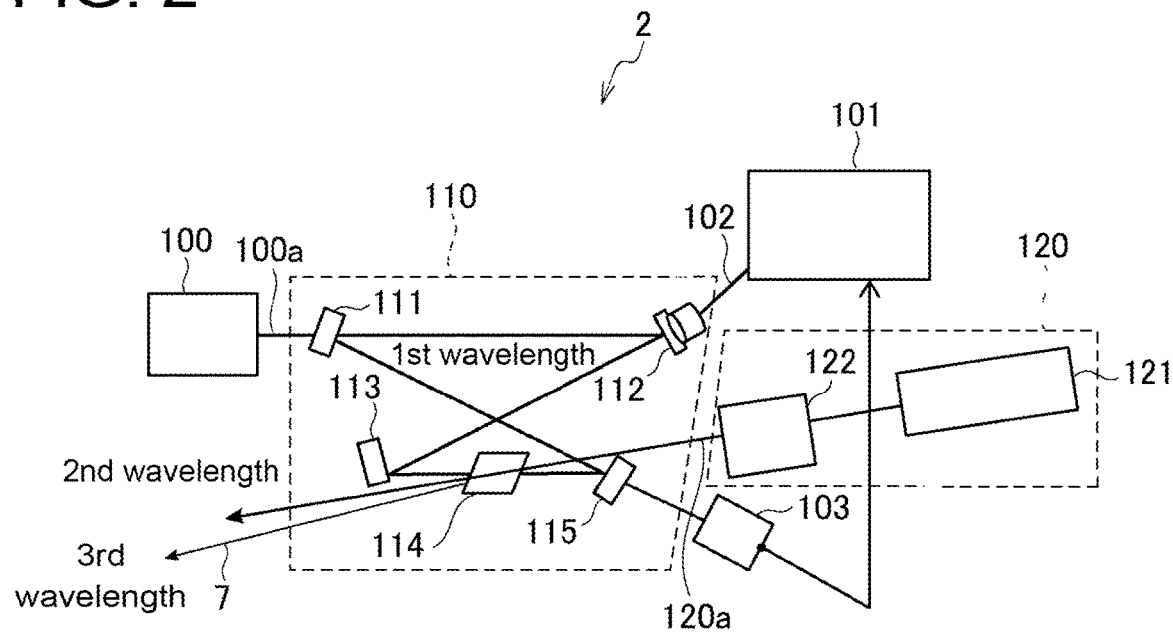
FIG. 2 is a schematic view of an overall configuration of the laser light source according to the embodiments of the present invention.

(2) Regarding the Laser Light Source According to the Embodiments of the Present Invention Next, an overall configuration of the laser light source according to the embodiments will be described first. As shown in FIG. 2, the laser light source 2 includes a first laser light source 100 configured to emit a continuous wave coherent light 100a, an optical resonator 110 including an optical path in which the continuous wave coherent light 100a is configured to circulate and including a non-linear optical element 114 disposed on the optical path, and a quasi-continuous wave light source 120 configured to emit a quasi-continuous wave coherent light 120a having a wavelength shorter than that of the continuous wave coherent light 100a and having a near rectangular output waveform. In the embodiments, the laser light source 2 further includes a photodetector 103, and a controller 101 configured to control a high-reflective piezo drive mirror 112 (to be described later) based on a detection signal from the photodetector 103.

The first laser light source 100 is a CW laser light source for oscillating a CW laser serving as the continuous wave coherent light 100a. Examples of the CW laser light source include a single frequency Nd:YAG laser that oscillates at a wavelength of 1064 nm, a single frequency fiber laser using Nd or Yb as an active substance that operates at a similar frequency to that of the Nd:YAG laser, and a solid-state laser and a semiconductor laser based on ceramics or polycrystals with the same or similar parent crystals or constituent elements. Any single frequency laser may be properly employed depending on the output as long as it can obtain frequency stability in a controllable range of a resonator length. In the embodiments, a single frequency Nd:YAG laser with a wavelength of 1064 nm that outputs a CW laser with an oscillation frequency stability of 1 MHz or less and a continuous wave power of 10 W is used as the first laser light source 100. It is desirable that the continuous wave coherent light 100a have a wavelength range of 750 nm to 2100 nm. As the first laser light source 100 that oscillates the continuous wave coherent light 100a, a laser light source having a wavelength spectrum of a single frequency and a narrow band is desired in order to enhance the electric field by the optical resonator 110. The wavelength of 750 nm to 2000 nm enables the sum frequency generation in a ultraviolet region suitable for the photoemission electron microscope using the laser oscillated by the laser light source as a fundamental wave.

For example, in a wavelength range of 750 nm to 1000 nm, a single frequency semiconductor laser light source may be employed. In a wavelength range of 1030 nm to 1080 nm, a solid-state laser, a fiber laser, or a combination thereof that is a hybrid laser using Yb (ytterbium) as an active substance may be employed. In a wavelength range of 950 nm to 1080 nm, a solid-state laser using Nd (neodymium) as an active substance may be employed. In a wavelength range of 1400 nm to 1600 nm, a fiber laser using Er (erbium) as a main active substance may be employed. In a wavelength range of 1900 nm to 2100 nm, a solid-state laser or a fiber laser using Tm (thulium) as an active substance may be employed.

The optical resonator 110 includes an impedance matching mirror 111, the high-reflective piezo drive mirror 112, a first high-reflective mirror 113, a second high-reflective mirror 115, and the non-linear optical element 114. In the optical resonator 110, these four mirrors constitute the optical path. The continuous wave coherent light 100a enters the optical resonator 110, passes through the impedance matching mirror 111, and circulates in the optical path in order of the impedance matching mirror 111, the high-reflective piezo drive mirror 112, the first high-reflective mirror 113, the second high-reflective mirror 115, and the impedance matching mirror 111. The non-linear optical element 114 is disposed on the optical path between the first high-reflective mirror 113 and the second high-reflective mirror 115 so that the continuous wave coherent light 100a can pass through the non-linear optical element 114 while circulating in the optical path. The non-linear optical element 114 is a crystal that creates a non-linear optical effect, such as wavelength conversion, on the passing laser light. Examples of the non-linear optical element include a CLBO ($CsLiB_6O_{10}$: cesium lithium borate) crystal or a β-BBO (β-$BaB_2O_4$: beta barium borate) crystal.

The impedance matching mirror 111 is a mirror for introducing the continuous wave coherent light 100a having a wavelength of 1064 nm oscillated by the first laser light source 100, into the optical resonator 110, and is highly transmissive to light having a wavelength of 1064 nm. The impedance matching mirror 111 is selected to have transmittance that is commensurate with an internal loss of the optical resonator 110 with respect to light having a wavelength of 1064 nm, that is, a total of an internal loss and a wavelength conversion loss of the non-linear optical element 114 constituting the optical resonator 110 plus optical losses of the four mirrors described above. Hence, the continuous wave coherent light 100a and the optical resonator 110 can be impedance-matched. Although the optical resonator 110 is highly reflective with respect to the continuous wave coherent light 100a, when the wavelength of the continuous wave coherent light 100a and the resonator length of the optical resonator 110 are matched, the continuous wave coherent light 100a can pass through the optical resonator 110. In other words, when the above conditions are satisfied, the continuous wave coherent light 100a is taken into the optical resonator 110, and an electric field strength of the continuous wave coherent light 100a in the optical resonator 110 reaches a maximum. The resonator length is a length of the optical path in which the above-described continuous wave coherent light 100a circulates.

The first high-reflective mirror 113 is a low-loss mirror having a reflectance of 99% with respect to light having a wavelength of 1064 nm. The second high-reflective mirror 115 is a mirror through which light having a wavelength of 1064 nm is able to transmit at a predetermined transmittance, and allows a part of the continuous wave coherent light 100a circulating in the optical path to enter the photodetector 103 disposed outside the optical resonator 110.

The high-reflective piezo drive mirror 112 includes a low-loss mirror having a reflectance of 99% with respect to light having a wavelength of 1064 nm and a piezoelectric element provided on a mirror base, and is connected to the controller 101 via a line 102. By the output of the photodetector 103, the piezoelectric element of the high-reflective piezo drive mirror 112 is driven by the controller 101 for feedback control so that the wavelength of the continuous wave coherent light 100a and the resonator length can be matched. Instead of the piezoelectric element of the high-reflective piezo drive mirror 112, a voice coil motor may be employed. Instead of using one of the piezoelectric element and the voice coil motor, both of them can be used at the same time as a hybrid type. The wavelength of the continuous wave coherent light 100a and the resonator length of the optical resonator 110 can be matched by changing the frequency of the continuous wave coherent light 100a. In this case, the output of the photodetector 103 is fed back to the first laser light source 100 to control the frequency of the continuous wave coherent light 100a so that the wavelength can match the resonator length.

The quasi-continuous wave light source 120 is a light source configured to emit a quasi-continuous wave coherent light 120a having a wavelength shorter than that of the continuous wave coherent light 100a and having a near rectangular output waveform. The quasi-continuous wave light source 120 is disposed such that the emitted quasi-continuous wave coherent light 120a is directly incident on the non-linear optical element 114 from outside the optical resonator 110. The quasi-continuous wave light source 120 includes a second laser light source 121 configured to emit a continuous wave coherent light having a wavelength shorter than that of the continuous wave coherent light 100a, and a waveform converter 122 configured to convert the output waveform of the continuous wave coherent light emitted from the second laser light source 121 into a near rectangular waveform.

The second laser light source 121 is a CW laser light source that oscillates a CW laser serving as the continuous wave coherent light (having a wavelength shorter than that of the continuous wave coherent light 100a). In the embodiments, a deep ultraviolet solid-state laser (manufactured by OXIDE Corporation: product name of Frequad-M) that performs continuous oscillation of light with a single wavelength of 266 nm is employed as the second laser light source 121, and power of the continuous wave is 1 W. It is desirable that the wavelength of the second laser light source 121 be in a range of 210 nm to 360 nm. This is because such a wavelength range encourages the wavelength conversion due to the non-linear effect of the non-linear optical element 114 (to be described later), and allows the laser light source 2 to emit a coherent light with high energy. The waveform converter 122 is an optical modulator that modulates the output waveform of the CW laser into a rectangle or other shapes. The optical modulator modulates the output of the CW laser with a carrier wave which is a rectangular wave, to generate a laser having a near rectangular output waveform. In this manner, the quasi-continuous wave light source 120 generates the quasi-continuous wave coherent light 120a having a wavelength shorter than that of the continuous wave coherent light 100a and having a near rectangular output waveform, and emits the quasi-continuous wave coherent light 120a to the non-linear optical element 114.

The optical modulator may change the waveform of the carrier wave to modulate the output waveform of the laser into any waveform. Instead of the optical modulator, an optical chopper may be employed as the waveform converter 122. The quasi-continuous wave light source 120 may not include the waveform converter 122. In this case, by controlling an application of current to the second laser light source 121 to change the intensity of the CW laser output by the second laser light source 121, the output waveform of the laser is formed into a rectangular wave, and thus the quasi-continuous wave coherent light 120a is generated. Alternatively, the second laser light source 121 may emit the CW laser on an off repeatedly to generate the quasi-continuous wave coherent light 120a. Among these methods for generating the quasi-continuous wave coherent light 120a, the method using the optical modulator and the method of controlling the application of current can involve not only a change in duty cycle of the quasi-continuous wave coherent light 120a but also the conversion of the output waveform into a shape other than the rectangular wave.

Figure 3:
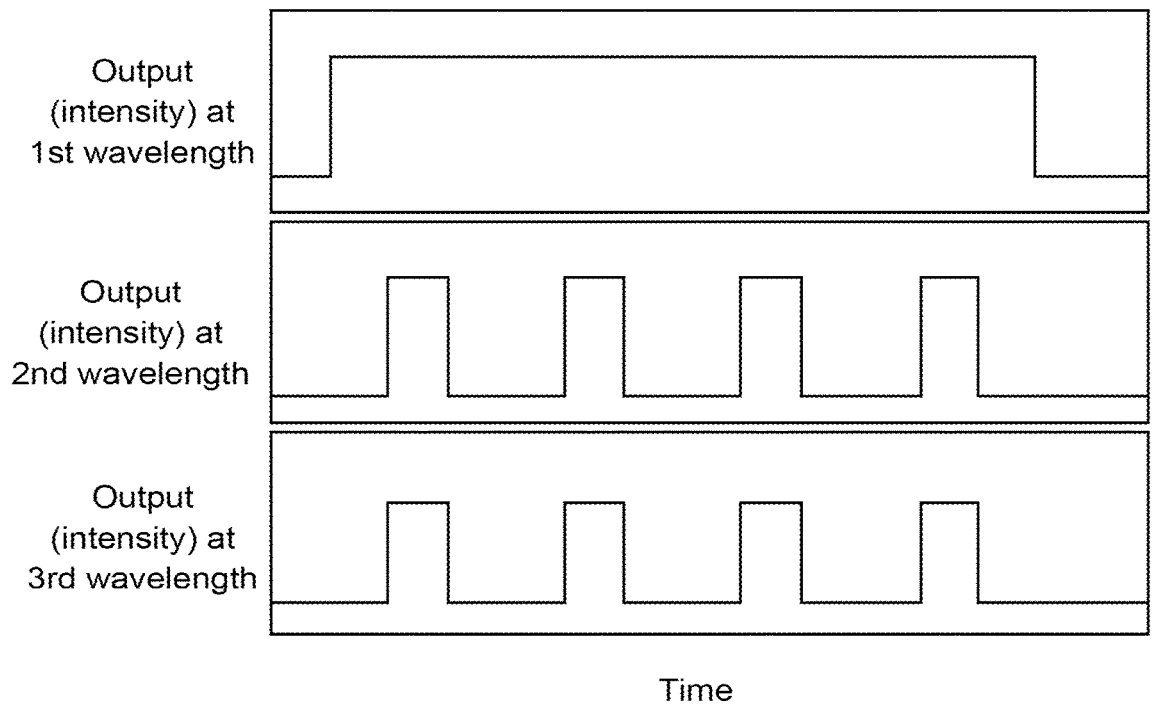
FIG. 3 is a schematic view illustrating a relationship between an output of light having a second wavelength and an output of light having a third wavelength.

Here, in the laser light source 2 shown in FIG. 2, the CW laser having a wavelength of 1064 nm (first wavelength $\lambda_1$) oscillated by the first laser light source 100 and the quasi-continuous wave coherent light 120a having a wavelength of 266 nm (second wavelength $\lambda_2$) oscillated by the quasi-continuous wave light source 120 are incident on the non-linear optical element 114. At this time, in the non-linear optical element 114, a coherent light having a third wavelength $\lambda_3$ that is different from the first wavelength $\lambda_1$ and the second wavelength $\lambda_2$ is created by sum frequency generation due to the non-linear optical effect. The relationship among these wavelengths is expressed as $1/\lambda_1+1/\lambda_2=1/\lambda_3$. In the embodiments, the second-wavelength light is the quasi-continuous wave coherent light 120a having a near rectangular output waveform. Therefore, as shown in FIG. 3, the quasi-continuous wave laser 7 having a wavelength of 213 nm which is shorter than the second wavelength and having a similar output waveform to that of the second-wavelength light (quasi-continuous wave coherent light 120a) is generated as a coherent light by the non-linear optical element 114, and the quasi-continuous wave laser 7 is emitted from the optical resonator 110 of the laser light source 2.

In the embodiments, the third-wavelength light (quasi-continuous wave laser), which is a quasi-continuous wave coherent light, is generated using a quasi-continuous wave coherent light as the second-wavelength light for generating the sum frequency, instead of using a CW laser. The reason behind this will be described below. Typically, in a CLBO crystal or a β-BBO crystal serving as the non-linear optical element used for the sum frequency generation, light absorption at a wavelength of 1064 nm is small, and heat production is small. Therefore, the optical path length hardly changes depending on a change in refractive index due to heat. Hence, unless the CW laser with the second wavelength is incident on the non-linear optical element 114, the resonator length of the optical resonator 110 can be maintained, and the electric field strength of the light having a wavelength of 1064 nm can be maintained. However, in the CLBO crystal or the β-BBO crystal, the light absorption cannot be negligible at a wavelength of 266 nm which is the second wavelength, and at a wavelength of 213 nm which is the third wavelength of the light generated by the sum frequency. For this reason, when the CW laser is used as the second-wavelength light, especially for a high-powered operation, the heat production occurs notably due to the light absorption by the non-linear optical element, and the resonator length changes depending on the change in the refractive index due to heat, and thus, stable wavelength conversion conditions cannot be satisfied. That is, when the incident intensity of the second-wavelength light is increased for the purpose of a high-powered sum frequency generation, the sum frequency output may not be increased, and the output may be eventually stopped.

On the other hand, since the output of the quasi-continuous wave coherent light 120a has a low level (stop state) period, the light absorption by the non-linear optical element 114 in the optical resonator 110 can be suppressed during the low level period, heat load on the non-linear optical element 114 can be reduced, and an effective output of the laser light source 2 can be improved. For the above reasons, in the embodiments, the quasi-continuous wave coherent light 120a is used as the second-wavelength light for the sum frequency generation.

In the embodiments, the laser light source 2 is controlled such that timing of shooting with the photoemission electron microscope 1 is synchronized with timing at which the output of the quasi-continuous wave laser 7 becomes a high level. More specifically, the laser light source 2 outputs the quasi-continuous wave laser 7 which is in a high level during shooting with the photoemission electron microscope 1 and is in a low level during a time interval between shots (e.g., time for moving the above-described spot, time for switching between the shooting conditions (e.g., polarization, wavelength, current, or voltage) of the photoemission electron microscope 1, or time for stimulating the sample (e.g., by application of current or magnetic field)).

In this manner, the laser light source 2 is used for the photoemission electron microscope 1 to synchronize the timing of shooting with the photoemission electron microscope 1 and the timing at which the output of the quasi-continuous wave laser 7 becomes a high level. With this synchronization, the light absorption and the heat production in the non-linear optical element 114 of the optical resonator 110 occur only when light irradiation is required for shooting with the photoemission electron microscope 1, and the light absorption and the heat production does not occur (in some cases, only weak light absorption and heat production that does not contribute to temperature changes occur) during the other periods. Consequently, it is possible to efficiently suppress the heat production in the non-linear optical element 114, and improve the effective output of the laser light source 2.

Figure 4:
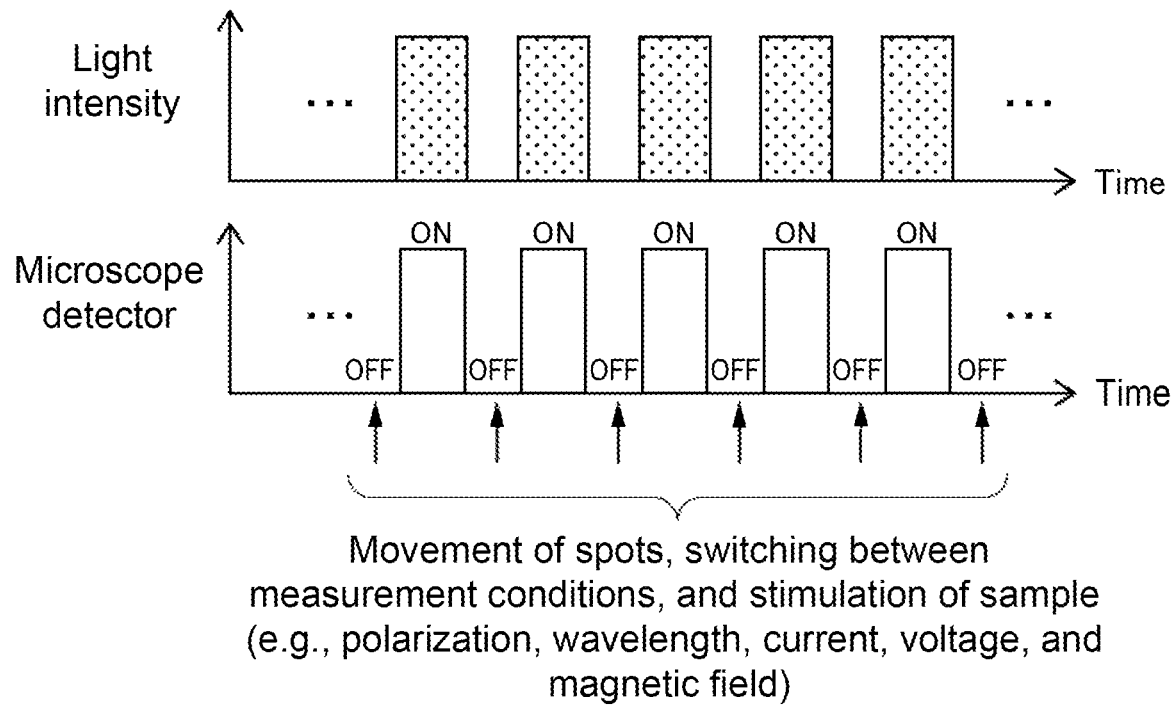
FIG. 4 is a schematic view illustrating a method of synchronizing timing of shooting with a photoemission electron microscope and timing at which an output of a quasi-continuous wave coherent light becomes a high level.

For example, as shown in FIG. 4, the synchronization between the timing of shooting with the photoemission electron microscope 1 and the timing at which the output of the quasi-continuous wave laser 7 becomes a high level can be implemented by synchronizing the timing of turning on and off the electron beam detector 25 of the photoemission electron microscope 1 and the timing at which the output of the quasi-continuous wave laser 7 becomes a high level and a low level. More specifically, a controller (not shown) of the photoemission electron microscope 1 or the controller 101 of the laser light source sends a synchronization signal to the electron beam detector 25 of the photoemission electron microscope 1 and the waveform converter 122 of the quasi-continuous wave light source 120 of the laser light source 2 to turn on the electron beam detector based on the synchronization signal and initiate the wavelength conversion.

Alternatively, instead of using the timing of turning on the electron beam detector 25, it is possible to use timing of finishing the movement of the spot of the quasi-continuous wave laser 7 by moving the stage 11 by the driving mechanism 12. It is not necessary to completely synchronize the timing of shooting with the photoemission electron microscope 1 with the timing at which the output of the quasi-continuous wave laser 7 becomes a high level, and a certain degree of difference in timing may be allowable. The duration of shooting with the photoemission electron microscope 1 may be set to be longer than, or conversely, to be shorter than the period during which the output of the quasi-continuous wave laser 7 is in a high level.

When the duration of shooting with the photoemission electron microscope 1 is synchronized with the period during which the output of the laser light source 2 is in a high level as described above, the waveform converter 122 modulates the output of the second laser light source 121 such that a duty cycle D of the quasi-continuous wave coherent light 120a (which is the second-wavelength light) for outputting the quasi-continuous wave laser 7 is given by D=Duration of high level/(Duration of high level+Duration of low level) =Duration of shooting/(Duration of shooting+Time interval between shots).

Figure 5:
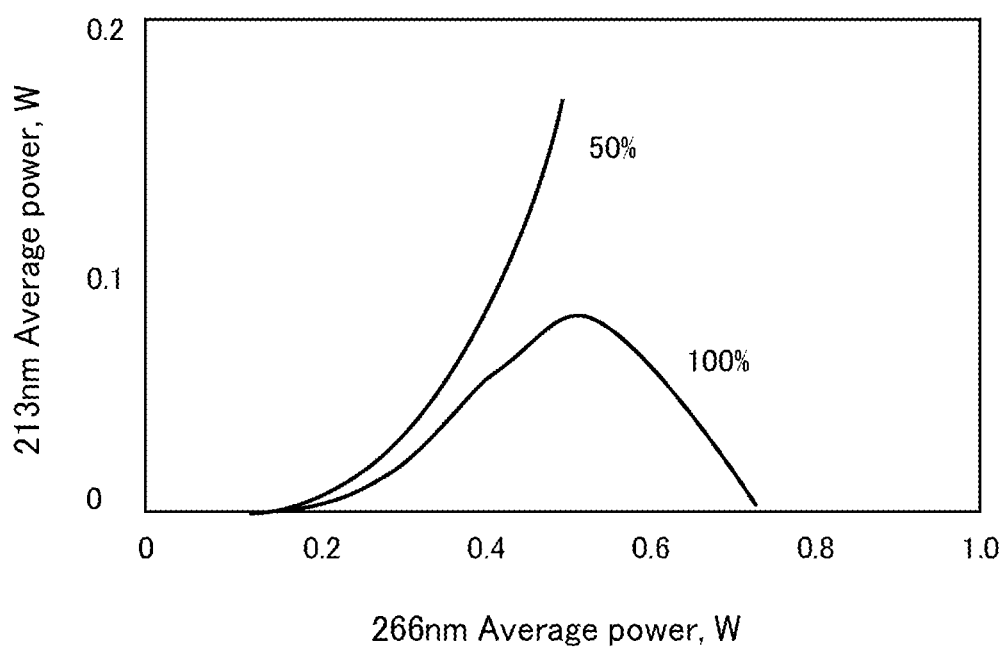
FIG. 5 is a graph illustrating a relationship between an average power of a quasi-continuous wave coherent light having a wavelength of 266 nm and an average power of a quasi-continuous wave laser having a wavelength of 213 nm.

It is desirable that the duty cycle D of the output of the quasi-continuous wave coherent light 120a be set to 50% or less. By modulating the output of the quasi-continuous wave coherent light 120a such that the duty cycle D is 50% or less, it is possible to increase the output power of the quasi-continuous wave laser 7 (which is the third-wavelength light), compared with the case where the duty cycle D is 100% (i.e., when not modulated). The lower limit of the duty cycle D may be appropriately set in consideration of the duration of shooting with the photoemission electron microscope 1 or the peak power of the quasi-continuous wave coherent light 120a. Experimental results proving this point are shown in FIG. 5. FIG. 5 is a graph in which a horizontal axis represents an average power of the quasi-continuous wave coherent light 120a having a wavelength of 266 nm and a vertical axis represents an average power of the quasi-continuous wave laser 7 having a wavelength of 213 nm, illustrating a relationship between the average power of the quasi-continuous wave coherent light 120a and the average power of the quasi-continuous wave laser 7 generated by the non-linear optical element 114 from the quasi-continuous wave coherent light 120a. The power of the first laser light source 100 is set to 5 W.

As shown in FIG. 5, when D is 100%, as the average power of the quasi-continuous wave coherent light 120a increases, the average power of the quasi-continuous wave laser 7 also increases, but the average power of the quasi-continuous wave laser 7 decreases in a region where the average power of the quasi-continuous wave coherent light 120a exceeds 0.5 W. On the other hand, when D is 50%, the average power of the quasi-continuous wave laser 7 is found to be higher than the case where D is 100% in an entire region, and the difference is also found to increase as the average power of the quasi-continuous wave coherent light 120a increases.

For example, when the power of the continuous wave coherent light 100a (which is the first-wavelength light) oscillated by the first laser light source 100 is 5 W, the peak power of the quasi-continuous wave coherent light 120a (which is the second-wavelength light) is 1 W, and the duty cycle D is 50%, the average power of the quasi-continuous wave coherent light 120a is found to be 0.5 W, and the average power of the quasi-continuous wave laser 7 is found to be 0.16 W. This value is about twice the average power of the quasi-continuous wave laser 7 when the duty cycle D is 100%. The findings confirm that the peak power of the quasi-continuous wave coherent light 120a (which is the second-wavelength light) can be set to 1 W. By further reducing the duty cycle D and lengthening the low level period, the heat production in the non-linear optical element 114 can be suppressed, and the peak power of the quasi-continuous wave coherent light 120a (which is the second-wavelength light) can be set to 1 W or more.

(3) Operation and Effect

The laser light source 2 according to the embodiments is used for the photoemission electron microscope 1 that emits the quasi-continuous wave laser (coherent light) 7, and includes the first laser light source 100 configured to emit the continuous wave coherent light 100a, the optical resonator 110 including the optical path in which the continuous wave coherent light 100a circulates and including the non-linear optical element 114 disposed on the optical path, and the quasi-continuous wave light source 120 configured to emit the quasi-continuous wave coherent light 120a having a wavelength shorter than that of the continuous wave coherent light 100a and having a near rectangular output waveform. When the quasi-continuous wave coherent light 120a is incident on the non-linear optical element 114 from outside the optical resonator 110 while the continuous wave coherent light 100a is entering the optical resonator 110 to circulate in the optical path, the quasi-continuous wave laser 7 having a wavelength shorter than that of the quasi-continuous wave coherent light 120a is emitted from the non-linear optical element 114.

In the laser light source 2, since the quasi-continuous wave coherent light having a near rectangular output waveform is incident on the non-linear optical element while the continuous wave coherent light is circulating in the optical path in the resonator, and the coherent light having a wavelength shorter than that of the quasi-continuous wave coherent light is emitted, there is a period during which no light absorption is present or an amount of light absorption is small in the non-linear optical crystal, thereby inhibiting the light absorption by that amount, reducing a heat load on the non-linear optical element, and improving an effective output of the laser light source. Moreover, it is possible to improve durability of the laser and reduce damage to the sample. Therefore, it is possible to improve a measurement throughput by higher intensity irradiation than usual without shortening the laser lifetime.

(4) Other Embodiments

The present invention is not limited to the first and the second embodiments, and various modifications may be made within the scope of the present invention. Although the single mode laser that performs continuous oscillation at a single wavelength of 266 nm is employed as the second laser light source 121 of the quasi-continuous wave light source 120 in the above embodiments, the present invention is not limited thereto. A multi-mode laser that performs multi-mode oscillation may be employed as the second laser light source 121 of the quasi-continuous wave light source 120. By employing the multi-mode laser as the second laser light source 121, the linewidth of the quasi-continuous wave laser 7 can be widened, and when the multi-mode laser is used for the photoemission electron microscope 1, it is possible to reduce speckles generated on the surface of the measurement sample 30, reduce noise in the shot image, and improve image resolution.

A wavelength-tunable laser may be employed as the second laser light source 121 of the quasi-continuous wave light source 120, which allows the wavelength (third wavelength) of the quasi-continuous wave laser 7 serving as a coherent light emitted from the laser light source 2 to be tunable. Various types of wavelength-tunable lasers may be employed as a light source. For example, a wavelength-tunable titanium-sapphire laser may be employed as the second laser light source 121 of the quasi-continuous wave light source 120, which makes it possible to set the wavelength of the laser from the second laser light source 121 to 210 nm to 360 nm using a second harmonic wave and a third harmonic wave of the wavelength-tunable titanium-sapphire laser, allowing the quasi-continuous wave light source 120 to generate the quasi-continuous wave coherent light 120a in the same wavelength range. As a result, the laser light source 2 is capable of emitting the quasi-continuous wave laser 7 having a wavelength of 175 nm to 267 nm by the sum frequency.

By using such a wavelength-tunable laser light source 2 for the photoemission electron microscope 1, it is possible to acquire information on the measurement sample in a desired depth direction. It is known that a detection depth of a photoemission electron microscope largely depends on an initial velocity of emitting photoelectrons. When the kinetic energy of photoelectrons is approximately 20 eV or less, an inelastic mean free path of electrons increases as the kinetic energy decreases, and thus the detection depth is known to tend to increase. The kinetic energy of photoelectrons largely depends on a wavelength of a light source. Therefore, as the wavelength increases, photon energy decreases, and thus the detection depth increases.

Figure 6A:
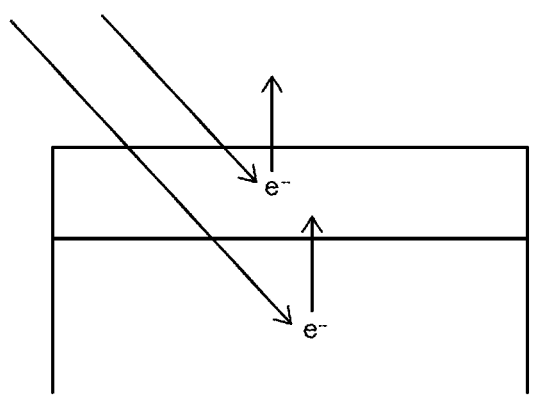
FIG. 6A is a schematic view illustrating a detection depth when the laser light source emits a short wavelength coherent light.
Figure 6A:
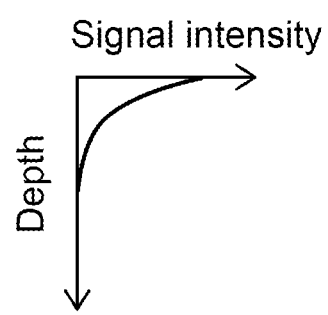
Figure 6B:
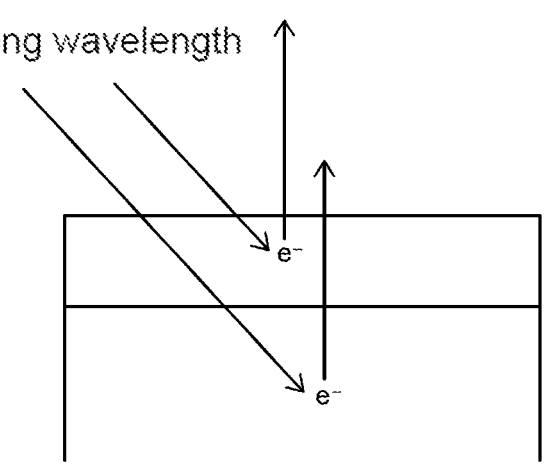
FIG. 6B is a schematic view illustrating a detection depth when the laser light source emits a long wavelength coherent light.
Figure 6B:
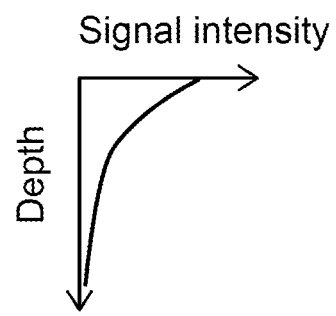

By using this property, it is possible to directly observe an internal structure of the measurement sample. FIGS. 6A and 6B show schematic views for illustrating such an observation method. Let us suppose that a metal Cu layer is provided on the surface of the measurement sample. The work function of Cu is 4.5 eV. At this time, the photon energy of the laser light source 2 is set to be higher than the work function of Cu, that is, the wavelength of the quasi-continuous wave laser 7 is set to 275 nm or less. Here, two measurements are made, the first with the photon energy of the quasi-continuous wave laser 7 being 5.8 eV ($hv_1$) and the second with the photon energy of 4.6 eV ($hv_2$).

In the first measurement ($hv_1$), the kinetic energy of photoelectrons is 1.2 eV higher at a maximum than in the second measurement ($hv_2$), and thus, the detection depth becomes small. As a result, it is possible to obtain information on a region relatively close to the sample surface (FIG. 6A). In the second measurement ($hv_2$), on the other hand, the initial velocity is as small as 0.1 eV at a maximum, and thus, the detection depth becomes large. As a result, it is possible to obtain information on a region relatively inside the sample (FIG. 6B).

A conventional ultrashort pulse light source uses an optical parametric amplifier or the like to switch between the wavelengths as described above. However, the ultrashort pulses cause a large space charge effect between emitting photoelectrons, which leads to deterioration in spatial resolution of a photoemission electron microscope. Since the laser light source 2 according to the modification uses the wavelength-tunable quasi-continuous wave light source 120, it is possible to implement the measurements which arbitrarily change the detection depth while suppressing the deterioration in the spatial resolution due to the space charge effect.

Factors behind the deterioration in the spatial resolution of the photoemission electron microscope include the space charge effect and a low kinetic energy of photoelectrons, in addition to various aberrations of the electron lens system. As mentioned earlier, the space charge effect can be reduced by using the quasi-continuous wave light source instead of the pulse light source. Meanwhile, the low kinetic energy of photoelectrons relates to a diffraction limit of electrons. To overcome the diffraction limit, it is necessary to emit photoelectrons with a high kinetic energy, which requires a light source with as high photon energy as possible. The laser light source has a higher brightness than a lamp light source, but it is difficult to realize a quasi-continuous wave light source with a high photon energy, i.e., a short wavelength. The laser light source according to the present invention emits a quasi-continuous wave, and is capable of emitting a quasi-continuous wave laser with a high photon energy of about 6.0 eV (wavelength of 367 nm). Therefore, it is possible to eliminate the above-described two factors behind the deterioration in spatial resolution at the same time. For example, in order to obtain a higher spatial resolution, the laser wavelength is set to be as short as possible by using the wavelength-tunable laser light source according to the modification, and then the measurement is performed.

In the laser light source 2 according to the present invention, it is possible to arbitrarily adjust the linewidth of the quasi-continuous wave laser 7 (coherent light) emitted from the laser light source 2 by appropriately changing the linewidth of the laser (continuous wave coherent light) emitted from the second laser light source 121 of the quasi-continuous wave light source 120. For example, utilizing this property, a laser light source with single mode oscillation is employed as the second laser light source 121 as in the embodiments described above, which makes it possible to decrease the linewidth of the quasi-continuous wave laser 7. Therefore, when the laser light source 2 is used for the photoemission electron microscope 1, it is possible to enhance energy resolution of photoelectron spectroscopic measurement.

To perform the photoelectron spectroscopic measurement, kinetic energy distribution of the photoelectrons emitted from the sample is analyzed by an energy analyzer. The energy resolution mainly depends on energy resolution of the energy analyzer and the linewidth of the laser light source. As the linewidth decreases, the spread of photon energy decreases, thereby enhancing the energy resolution of the measurement.

Conventionally, a diffraction grating or an etalon is used to reduce the linewidth of the light source, which makes it possible to enhance the energy resolution. In this conventional method, however, light intensity is reduced by the diffraction grating or the etalon. Hence, as the linewidth becomes small, signal intensity of the photoelectron spectroscopic measurement is reduced, and thus, the measurement throughput is lowered. In contrast, according to the present invention, the linewidth can be arbitrarily adjusted in the laser oscillation. Therefore, it is possible to prevent the above-mentioned reduction in signal intensity, and to achieve both high energy resolution and measurement throughput.

REFERENCE SIGN LIST 1 photoemission electron microscope
2 laser light source
7 quasi-continuous wave laser
13 energy adjusting mechanism
14 power source
21 first electron lens system
22 energy analyzer
23 energy slit
24 second electron lens system
25 electron beam detector
27 electron beam

The invention claimed is:

1. A photoemission electron microscope comprising:
a laser light source configured to emit a coherent light to irradiate a measurement sample;
an irradiation lens system configured to focus the coherent light from the laser light source onto a surface of the measurement sample;
a controller configured to control level of the coherent light; and
a driving mechanism configured to move a position of an irradiation spot of the coherent light on the surface of the measurement sample, wherein
the laser light source comprises:
a first laser light source configured to emit a continuous wave coherent light;
an optical resonator including an optical path in which the continuous wave coherent light is configured to circulate and including a non-linear optical element disposed on the optical path; and
a quasi-continuous wave light source configured to emit a quasi-continuous wave coherent light having a wavelength shorter than that of the continuous wave coherent light and having a near rectangular output waveform, wherein
when the quasi-continuous wave coherent light is incident on the non-linear optical element from outside the optical resonator while the continuous wave coherent light is entering the optical resonator to circulate in the optical path, the coherent light having a wavelength shorter than that of the quasi-continuous wave coherent light is configured to be emitted from the non-linear optical element, and
the controller is configured to cause the coherent light to be in a high level during shooting with the photoemission electron microscope and to be in a low level at least when the driving mechanism moves the position of the irradiation spot of the coherent light on the surface of the measurement sample.

2. The photoemission electron microscope according to claim 1, further comprising:
an energy analyzer configured to disperse photoelectrons emitted from the measurement sample according to energy of the photoelectrons; and
an electron beam detector configured to detect a part of the photoelectrons with a certain energy based on dispersion in the energy analyzer.

3. The photoemission electron microscope according to claim 1, wherein
the non-linear optical element is CLBO or β-BBO.

4. The photoemission electron microscope according to claim 1, wherein
the continuous wave coherent light has a wavelength of 750 nm to 2100 nm.

5. The photoemission electron microscope according to claim 1, wherein
the quasi-continuous wave coherent light has a wavelength of 210 nm to 360 nm.

6. The photoemission electron microscope according to claim 1, wherein
the quasi-continuous wave light source comprises:
a second laser light source configured to emit a continuous wave coherent light; and
an optical modulator configured to modulate an output waveform of the continuous wave coherent light emitted from the second laser light source into the near rectangular output waveform.

7. The photoemission electron microscope according to claim 1, wherein
the quasi-continuous wave light source comprises a second laser light source configured to emit a continuous wave coherent light on and off repeatedly to generate the quasi-continuous wave coherent light.

8. The photoemission electron microscope according to claim 1, wherein
the quasi-continuous wave light source is controlled such that timing at which an output of the laser light source becomes a high level is synchronized with timing of shooting with the photoemission electron microscope.

9. The photoemission electron microscope according to claim 1, wherein
the quasi-continuous wave coherent light has a duty cycle of 50% or less.

10. The photoemission electron microscope according to claim 1, wherein
a peak power of the quasi-continuous wave coherent light is 1 W or more.

11. The photoemission electron microscope according to claim 1, wherein
the quasi-continuous wave light source is wavelength tunable.

12. The photoemission electron microscope according to claim 1, wherein
the quasi-continuous wave light source includes a wavelength-tunable titanium-sapphire laser and is configured to generate the quasi-continuous wave coherent light from a second harmonic wave or a third harmonic wave of the wavelength-tunable titanium-sapphire laser.

13. The photoemission electron microscope according to claim 6, wherein
the second laser light source is configured to perform a multi-mode oscillation of the continuous wave coherent light.

* * * * *